(12) United States Patent
Maes (10) Patent No.: US 7,716,682 B2
(45) Date of Patent: May 11, 2010

(54) MULTIMODAL OR MULTI-DEVICE CONFIGURATION

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 56 days.

(21) Appl. No.: 11/326,209

(22) Filed: Jan. 4, 2006

(65) Prior Publication Data

US 2007/0157216 A1 Jul. 5, 2007

(51) Int. Cl.
 G06F 3/00 (2006.01)
 G06F 9/44 (2006.01)
 G06F 9/46 (2006.01)
 G06F 13/00 (2006.01)

(52) U.S. Cl. .................. 719/317; 719/320

(58) Field of Classification Search .......... 719/320, 719/317, 310; 709/202–205, 223–226, 248; 709/209; 717/114
 See application file for complete search history.

(56) References Cited

U.S. PATENT DOCUMENTS

| | | | |
|---|---|---|---|
| 6,807,529 B2 * | 10/2004 | Johnson et al. | 704/270.1 |
| 6,912,581 B2 * | 6/2005 | Johnson et al. | 709/228 |
| 7,085,756 B2 * | 8/2006 | Carey et al. | 707/3 |
| 7,454,608 B2 * | 11/2008 | Gopalakrishnan et al. | 713/100 |
| 7,584,280 B2 * | 9/2009 | Kim et al. | 709/226 |
| 2002/0119788 A1 * | 8/2002 | Parupudi et al. | 455/456 |
| 2002/0194388 A1 * | 12/2002 | Boloker et al. | 709/310 |
| 2003/0063728 A1 * | 4/2003 | Sibal et al. | 379/207.02 |
| 2004/0243691 A1 * | 12/2004 | Viavant et al. | 709/220 |
| 2005/0138219 A1 * | 6/2005 | Bou-Ghannam et al. | 710/1 |
| 2005/0138647 A1 * | 6/2005 | Bou-ghannam et al. | 719/328 |
| 2006/0036770 A1 * | 2/2006 | Hosn et al. | 709/248 |

* cited by examiner

*Primary Examiner*—Hyung S Sough
*Assistant Examiner*—KimbleAnn Verdi
(74) *Attorney, Agent, or Firm*—Townsend and Townsend and Crew LLP (57) ABSTRACT

Embodiments of the present invention provide methods, system and machine-readable media for dynamic configuration and/or support for application using multiple modes and/or devices. Generally speaking, dynamic configuration and/or support for an application using multiple modes and/or devices can comprise accessing a multimodal and/or multi-device application via a user agent of a user device. The user agent can determine a plurality of modes or devices supported by the application and request multimodal services based on the modes or devices supported by the application. A multimodal/multi-device infrastructure communicatively coupled with the user agent can be adapted to register components of a multimodal service in a central repository. In response to the request for multimodal services from the user agent of the user device, the multimodal/multi-device infrastructure can locate services supporting the one or more modes or devices based on the registered components of the multimodal service in the central repository.

38 Claims, 6 Drawing Sheets

FIG. 6

MULTIMODAL OR MULTI-DEVICE CONFIGURATION

BACKGROUND OF THE INVENTION

Embodiments of the present invention relate generally to multimodal and/or multiple-device applications and more particularly to providing dynamic configuration and/or support for applications using multiple modes and/or devices.

Multimodal applications are applications that utilize multiple modes of operation or input/output such as presenting a Graphical User Interface (GUI), a voice interface, text, handwriting, and/or other modalities. Multi-device applications are applications that can be executed, simultaneously or not, on multiple devices of different types such as a cell phone, Personal Digital Assistant (PDA), personal computer, etc. Furthermore, an application can combine multiple modes and multiple devices to, for example, present different interfaces to different types of devices, present multiple interfaces, present multiple interfaces of certain types to only particular types of devices, etc.

Generally speaking, the execution model of multimodal and multi-device applications can be described as follows. First, a user interacts with one of the available modalities. For example, the user accesses a web page via his personal computer. Interaction events resulting from the user's interactions with this modality or device are generated by an agent for that mode or device. The interaction events are passed to a synchronization manager that handles a representation of the interaction event and determines the impact of the interaction based on the state of the application and synchronization scheme. The synchronization manager updates its internal representation of the state of the application and sends update events to registered agents or applications for each of the other modes or devices. Any interaction or change resulting from the user's interaction with the first mode or device is then performed by the agent(s) for the other modes or devices based on the update events. Therefore, changes or interactions with the application made in one mode or via one device can be propagated through the synchronization manager to the agents for the other modes or devices to update those modes or devices.

However, such a model assumes that the configuration, i.e., the devices and modalities and the agents for each, have been established and remain static. That is, the synchronization manager is hard-coded to interact with the application and the modes and devices it is able to use as well as the individual agents for each modality or device. There is no way for the manager to dynamically discover and utilize an agent for a particular modality or device based on the application and the modes or devices it may support or utilize. Rather, to add or change modalities, the application, synchronization manager, and agents must be coded or re-coded. Hence, there is a need for methods and systems that allow dynamic configuration and/or support for application using multiple modes and/or devices.

BRIEF SUMMARY OF THE INVENTION

Systems, methods, and machine-readable media are disclosed for dynamic configuration and/or support for applications using multiple modes and/or devices. In one embodiment, a system for providing multimodal configuration and support can comprise a system having stored therein a multimodal application. A user agent can be communicatively coupled with the system. The user agent can be adapted to access the multimodal application, determine a plurality of modes or devices supported by the application, and request multimodal services based on the modes or devices supported by the application. The system can also include a multimodal infrastructure communicatively coupled with the user agent. The multimodal infrastructure can be adapted to register components of a multimodal service in a central repository and, in response to the request for multimodal services from the user agent, locate services supporting the one or more modes or devices based on the registered components of the multimodal service in the central repository.

According to one embodiment, the multimodal infrastructure can be further adapted to launch a multimodal manager in response to the request for multimodal services from the user agent. The user agent can be adapted to initiate a session with the multimodal manager of the multimodal infrastructure and provide application data from the multimodal application to the multimodal manager. The multimodal manager of the multimodal infrastructure, in response to receiving the application data from the user agent, can determine one or more components for supporting execution of the application, initiate the one or more components, and synchronize the one or more components with the application data from the user agent.

According to another embodiment, a method of providing multimodal configuration and support can comprise accessing a multimodal application. A plurality of modes or devices supported by the application can be determined. Determining the plurality of modes or devices supported by the application can be based, for example, on information explicitly provided by the application, by parsing application data and inferring the plurality of modes or devices, and/or based on information obtained from an external source. Multimodal services can be requested based on the modes or devices supported by the application. Information identifying one or more multimodal services related to the modes or devices supported by the application can be read from a central repository. The method can further include initiating a session with a multimodal manager of a multimodal infrastructure and providing application data from the multimodal application to the multimodal manager.

According to yet another embodiment, a method of providing multimodal configuration and support can comprise registering components of a multimodal service in a central repository. A request for multimodal services can be received from a user agent. The request can indicate one of more modes or devices. In response to the request for multimodal services from the user agent, services supporting the one or more modes or devices can be located based on the registered components of the multimodal service in the central repository.

The method can further include launching a multimodal manager in response to the request for multimodal services from the user agent and initiating a session between the multimodal manager and the user agent. According to one embodiment, in response to receiving application data related to a multimodal application from the user agent, one or more components for supporting execution of the application can be determined. The one or more components can be initiated and synchronized with the application data from the user agent.

According to one embodiment, locating services supporting the one or more modes or devices based on the registered components of the multimodal service in the central repository can be based on load balancing between the services. In such a case, the method can further comprise dynamically balancing the load between services. In other cases, locating services supporting the one or more modes or devices based on the registered components of the multimodal service in the central repository can be based on availability of the services.

The method can further comprise activating or deactivating the multimodal manager based on preferences of a user of the user device, application data from the user agent of the user device, a request from the user agent of the user device, etc. The preferences of the user of the user device can comprise server-side preferences, user agent preferences, multimodal manager preferences, etc. According to one embodiment, the method can further comprise ending the session between the multimodal manager and the user agent based on the user agent deactivating itself or deactivating another user agent.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for dynamic configuration and/or support for applications using multiple modes and/or devices. Generally speaking, dynamic configuration and/or support for applications using multiple modes and/or devices can comprise accessing a multimodal and/or multi-device application via a user agent. In some cases, the user agent may be located and/or operate on a user device. In other cases, the user agent may be on a server such as a server providing the multimodal and/or multi-device application or another server. Regardless of its location, the user agent can determine a plurality of modes or devices supported by the application and request multimodal services based on the modes or devices supported by the application. A multimodal/multi-device infrastructure can communicatively coupled with the user agent and can be adapted to register components of a multimodal service in a central repository. In response to the request for multimodal services from the user agent, the multimodal/multi-device infrastructure can locate services supporting the one or more modes or devices based on the registered components of the multimodal service in the central repository.

According to one embodiment, the multimodal/multi-device infrastructure can be further adapted to launch a multimodal manager in response to the request for multimodal services from the user agent. The user agent can be adapted to initiate a session with the multimodal manager of the multimodal/multi-device infrastructure and provide application data from the multimodal application to the multimodal manager. The multimodal manager of the multimodal/multi-device infrastructure, in response to receiving the application data from the user agent, can determine one or more components for supporting execution of the application, initiate the one or more components, and synchronize the one or more components with the application data from the user agent.

As used herein the term user agent refers to a logical component that can render presentation data into physical effects that can be perceived and interacted with by the user; and/or that can capture physical actions from the user and interpret them as interactions that can be reflected into presentation updates and/or update a data model. It may provide one or multiple modality and support input only, output only or combined input and output. Multimodal/multi-device configuration refers to a device, system, component, etc. that performs configuration of resources (multimodal/multi-device infrastructure) that supports multimodal and/or multi-device user interaction.

Embodiments of the present invention may be implemented in a wide variety of environments and systems. For example, various embodiments may be presented through an Internet web browser and/or a web service. Other types of client-server, peer-to-peer, or other environments are considered to be equally suitable for implementing embodiments of the present invention. Furthermore, components of the system described herein may be implemented in various manners. For example, while illustrated and discussed herein as being located and/or executed on a user device, it should be understood that a user agent for accessing a multimodal application need not be located on and/or executed by a user device. Rather, this implementation is offered by way of example and not limitation. In other implementations, a user agent for accessing a multimodal and/or multi-device application can reside and/or operate on other components such as the server or other system providing the application. Other variations are also contemplated and considered to be within the scope of the present invention.

Figure 1:
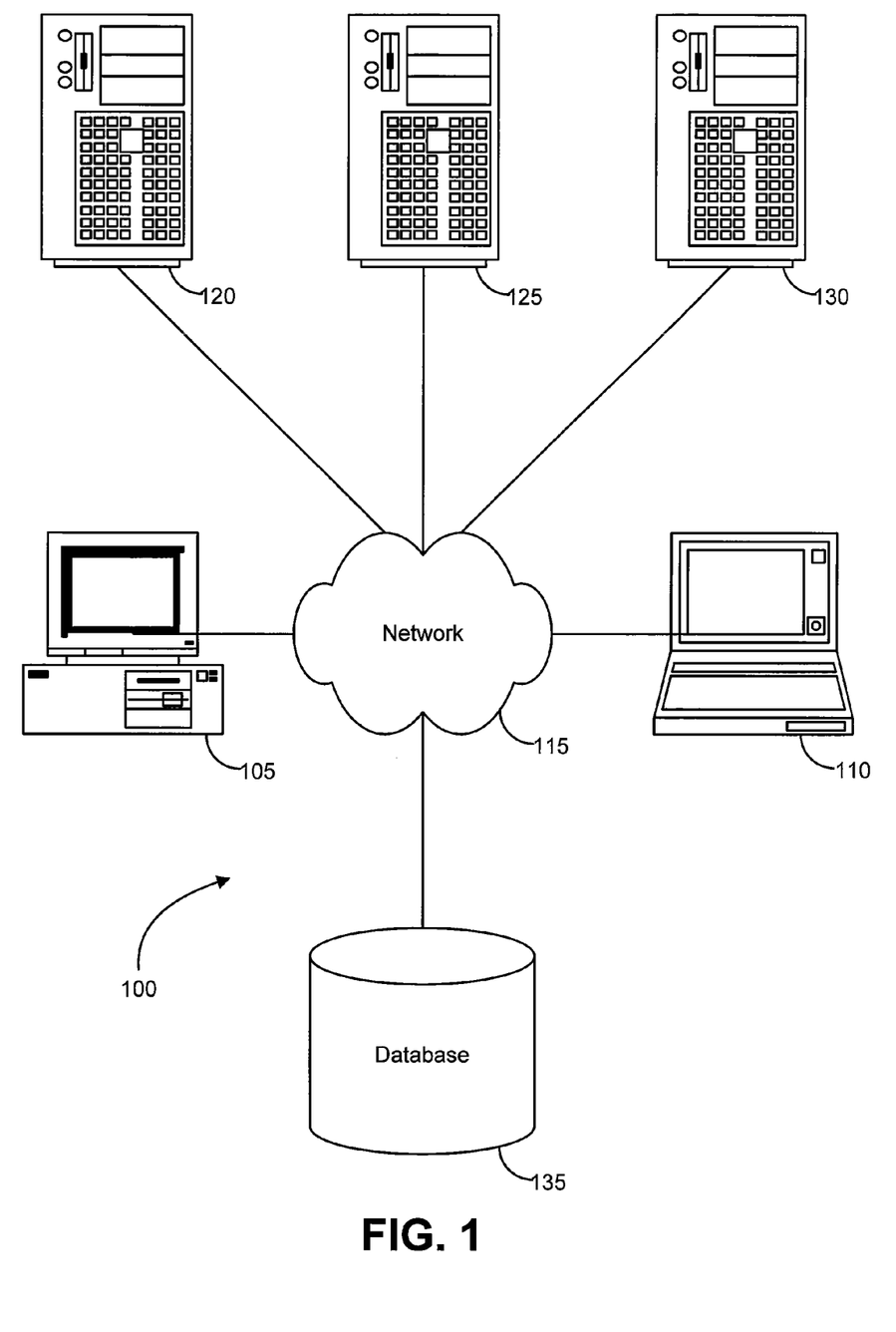
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of MICROSOFT WINDOWS™ and/or MACINTOSH™ operating systems) and/or workstation computers running any of a variety of commercially-available UNIX™ or UNIX™-like operating systems (including without limitation, the variety of LINUX™ operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX™, APPLETALK™, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the BLUETOOTH™ protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX™ servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, JAVA™ servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as JAVA™ C, C# or C++, and/or any scripting language, such as PERL™, PYTHON™, or TCL™, as well as combinations of any programming/scripting languages. The server(s) may also include database servers, including without limitation those commercially available from ORACLE™, MICROSOFT™, SYBASE™, IBM™, and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as ORACLE™ 10g, that is adapted to store, update, and retrieve data in response to SQL-formatted commands.

Figure 2:
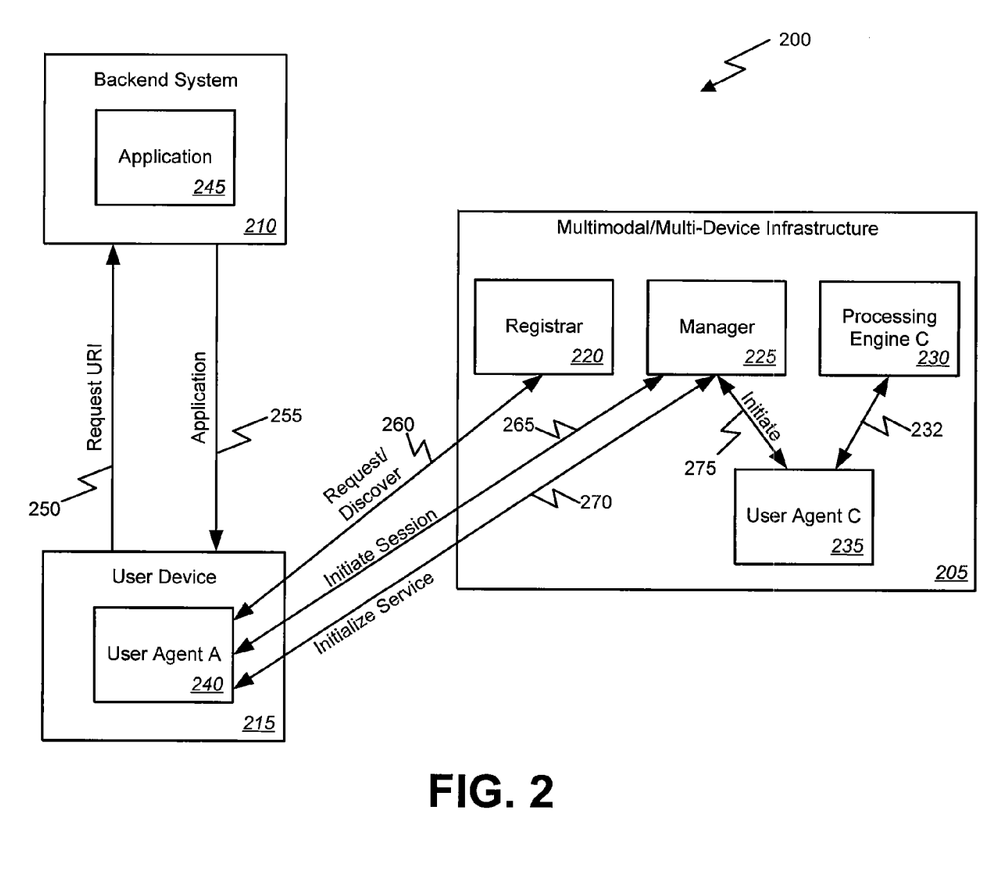
FIG. 2 is a block diagram illustrating functional components of a system for providing multimodal and/or multi-device configuration and support according to one embodiment of the present invention.

FIG. 2 is a block diagram illustrating functional components of a system for providing multimodal and/or multi-device configuration and support according to one embodiment of the present invention. This example represents, conceptually, components that may be implemented in an environment such as described above with reference to FIG. 1 or any other suitable environment for providing multimodal and/or multi-device services and/or applications.

In this example, the system 200 for providing multimodal configuration and support comprises a backend system 210, a user device 215, and components of a multimodal/multi-device infrastructure 205. The user device 215 can be communicatively coupled with the backend system 210 and the components of the multimodal/multi-device infrastructure 205 via a communication network such as described above or any other suitable communications media. While shown here as located on user device 215, it should be noted that this first user agent 240 can be located and/or operated by other components of the system 200. For example the user agent 240 can be located and/or operated on the backend system 210 or another server (not shown here). Other variations are also contemplated and considered to be within the scope of the present invention.

The backend system 210, such a web server or other system, can have stored therein a multimodal and/or multi-device application 245 providing support for multiple modes of operation or input/output. For example, the application 245 may support multiple interface modes such as a Graphical User Interface (GUI), a voice interface, text, handwriting, and/or other modalities. Additionally, the application 245 may provide support for execution on multiple devices of different types such as a cell phone, Personal Digital Assistant (PDA), personal computer, etc.

The user agent 240 may send a request Universal Resource Identifier (URI) 250 to the backend system 210 which in turn can provide 255 the application 245 or access to the application 245 for execution on the backend system 210 or user device 215. Once the application 245 or access to the application 245 has been received, the user agent 240 can determine that a plurality of modes or devices is needed to support the application 245. The user agent 240 can determine the plurality of modes or devices to support the application 245 based on information explicitly provided by the application 245, by parsing application data and inferring the plurality of modes or devices, by reading information from a source separate from the user agent 240 and the multimodal/multi-device infrastructure 205 such as a Universal Description, Discovery, and Integration (UDDI) repository associated with a multimodal service or other catalog of modes or devices, or by other methods. For example, the user agent can determine the plurality of modes or devices supported by the application based on information obtained from a Uniform Resource Locator (URL) for the application, information obtained from an extension of a file returned by the application, information obtained from a content of a file, etc. The user agent 240 can then request 260 multimodal and/or multi-device capabilities from a set of multimodal/multi-device infrastructure components 205 based on the modes or devices supported by the application 245 to have the multimodal / multi-device infrastructure configured with the right features based on the needs of the application.

The multimodal/multi-device infrastructure components 205 can be a registered in a central repository or registrar 220. For example, the registrar 220 can be an addressable component where the multimodal and multi-device components of 205, such as agents 235 and engines 230, that can support setup of a multimodal/multi-device infrastructure can register their address or other identifying information through which they can be located and/or accessed. In response to the request 260 for multimodal services from the user agent 240, the components of the multimodal/multi-device infrastructure 205 supporting the one or more modes or devices supported by the application 245 can be located and configured. Locating these components can be based on the registered components of the multimodal service in the registrar 220. Alternatively, the registrar 220 may be made available to or accessible by the user agent 240 which can look-up or otherwise discover the registered components that are already configured. In such a case, the user agent only establishes a session with a block of components already correctly configured.

Once the registered components have been identified, a multimodal manager 225 can be launched. Again, there are multiple options or variations. For example, the components may be launched already, i.e., already executing, by the multimodal and/or multi-device infrastructure and registered as being available. Alternatively, the capabilities and/or locations of the components may be registered but not yet launched. In such a case, when the request is received, the corresponding component can be identified and launched. In both cases, registration or invocation may be routed to an available component using load balancing techniques.

The user agent 240 of the user device 215 can initiate 265 a session with the multimodal manager 225 and provide application data from the application 245 to the multimodal manager 225. Additionally, the multimodal manager 225, in response to receiving the application data from the user agent 240 of the user device 215, can determine one or more components for supporting execution of the application such as user agent 235 and processing engine 230. These components can be setup following the same flow and approach as used to setup the multimodal manager 225 but now the multimodal manager 225 can be used to setup these other components. The user agent 235 of the multimodal/multi-device infrastructure 205 provides a copy or other rendition of the application 245 or application data that is available to the multimodal/multi-device infrastructure components 205. Processing engine 230 is the logical component that transforms 232 user physical I/O to a format useful for the user agent 235, e.g. voice to text, ink to text, display, keyboard, T9, TTS, etc. Importantly, while only one agent 235 and processing engine 230 is shown here, any number of agents and processing engines may be used depending upon the implementation and the modes and/or devices being supported.

Once the multimodal/multi-device manager 225 determines which agent(s) 235 and processing engine(s) 230 are to be used to support execution of the application 245, the multimodal/multi-device manager 225 can initiate 275 the one or more components 235 and 230, and synchronize 270 them with the application data from the user agent 240 of the user device 215. The multimodal manager 225 then coordinates data and synchronizes execution flow to and from the user agent 240 and other components of the system 200 during execution of the application 245.

According to one embodiment, the multimodal/multi-device infrastructure 205 can be further adapted to activate or deactivate the multimodal manager 225. Multimodal activation refers to the act of making a user agent 235 available to the multimodal manager 225. Multimodal de-activation refers to the act of making a user agent 235 unavailable to the multimodal manager 225. Activation and/or deactivation can be based on preferences of a user of the user device 215. The preferences of the user of the user device 215 can comprise server-side preferences, user agent preferences, multimodal manager preferences, etc. Alternatively or additionally, activation and/or deactivation can be based on application data from the user agent 240 of the user device 215 or based on a request from the user agent 240 of the user device 215. Furthermore, the multimodal/multi-device infrastructure 205 can be further adapted to end the session between the multimodal manager 225 and the user agent 240 of the user device 215 based on the user agent 240 of the user device 215 deactivating itself or based on the user agent 240 of the user device 215 deactivating another user agent.

Figure 3:
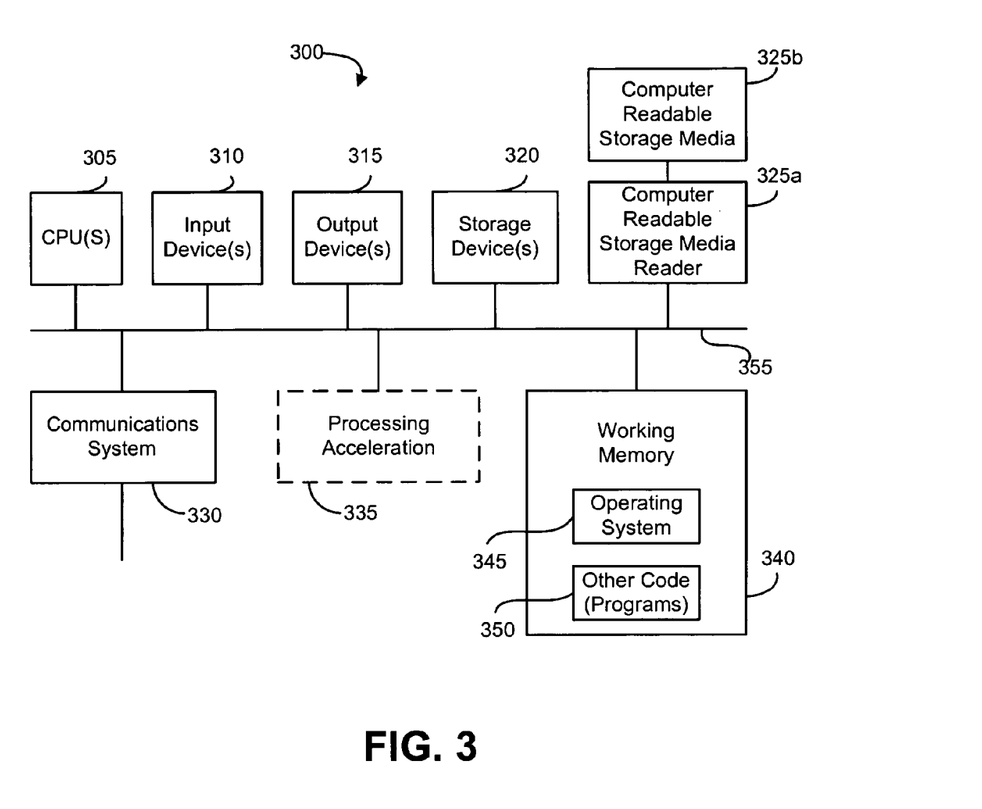
FIG. 3 is a block diagram illustrating an exemplary computer system in which embodiments of the present invention may be implemented.

FIG. 3 illustrates an exemplary computer system 300, in which various embodiments of the present invention may be implemented. The system 300 may be used to implement any of the computer systems described above such as the backend system 210, user device 215, multimodal/multi-device infrastructure 205, etc.. The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325*a*, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325*a* can further be connected to a computer-readable storage medium 325*b*, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350, such as an application program (which may be a client application, web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed. Software of computer system 300 may include code 350 for implementing processes for dynamically providing multimodal and/or multi-device configuration and support.

Generally speaking, dynamic configuration and/or support for an application using multiple modes and/or devices can comprise accessing a multimodal and/or multi-device application via a user agent of a user device. The user agent can determine a plurality of modes or devices supported by the application and request multimodal services based on the modes or devices supported by the application. A multimodal/multi-device infrastructure communicatively coupled with the user agent can be adapted to register components of a multimodal service in a central repository. In response to the request for multimodal services from the user agent of the user device, the multimodal/multi-device infrastructure can locate services supporting the one or more modes or devices based on the registered components of the multimodal service in the central repository.

According to one embodiment, the multimodal/multi-device infrastructure can be further adapted to launch a multimodal manager in response to the request for multimodal services from the user agent of the user device. The user agent of the user device can be adapted to initiate a session with the multimodal manager of the multimodal/multi-device infrastructure and provide application data from the multimodal application to the multimodal manager. The multimodal manager of the multimodal/multi-device infrastructure, in response to receiving the application data from the user agent of the user device, can determine one or more components for supporting execution of the application, initiate the one or more components, and synchronize the one or more components with the application data from the user agent of the user device.

Figure 4:
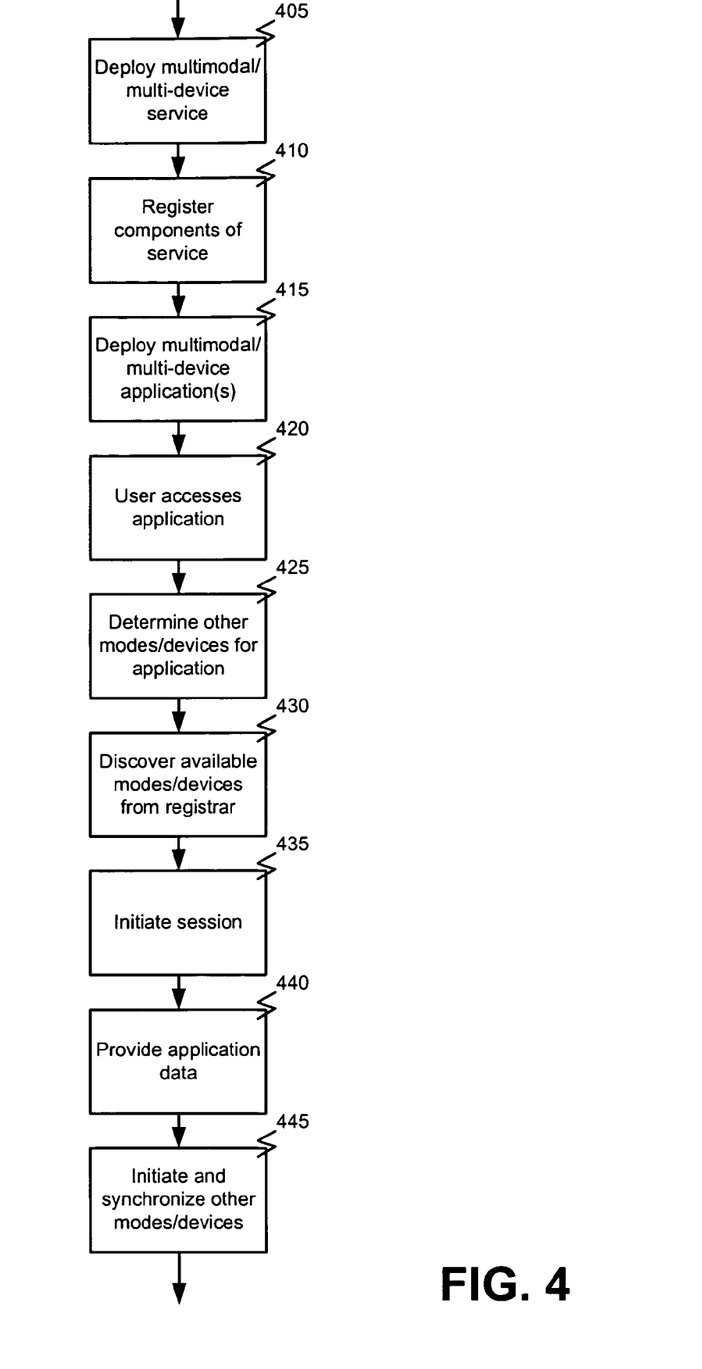
FIG. 4 is a flowchart illustrating, at a high level, a process for providing multimodal and/or multi-device configuration and support according to one embodiment of the present invention.

FIG. 4 is a flowchart illustrating, at a high level, a process for providing multimodal and/or multi-device configuration and support according to one embodiment of the present invention. In this example, a multimodal and/or multi-device service is first deployed 405 by a service provider deployment team. That is, the service provider makes available for use a multimodal/multi-devices infrastructure components 205. Alternatively, the application and the multimodal/multi-device infrastructure components may be implemented on the same device. Also, the addresses and capabilities of the different components that the service provider make available to support its multimodal and multi-device services are registered 410 such as in registrar 220 or a central repository within or separate from the multimodal/multi-devices infrastructure 205.

An application developer writes and deploys 415 a multimodal and/or multi-device application 245. This application is made available on a backend server 210 such as a web application server, through, for example, a URI. A user accesses 420 the multimodal and/or multi-device application 245 by entering or clicking/selecting a URI on one of its user agents 240. The web application server serves the multimodal and/or multi-device application 245 to the user's device 215.

The user agent 240 that initiated the request determines 425 the other components and configurations supported by the application 245. This can be achieved in multiple ways. For example, the application data could contain information explicitly provided by the application developer including, possibly, details on the capabilities and/or configurations of the other components. Alternatively or additionally, the user agent 240 may be able to extract details on what other modalities, components and their capabilities to involve by parsing the received application data. Alternatively or additionally, the user agent 240 may be able to extract that information from another source such as, for example, a UDDI repository associated to the service.

The user agent 240 then discovers 430 from the multimodal registrar 220 the available components. This can be accomplished by the user agent 240 querying or otherwise accessing the information in the registrar 220. Alternatively, it may involve the user agent 240 requesting the multimodal/multi-device infrastructure to look up or otherwise access the information in the registrar 220 and provide it to the user agent 240. In some implementations, discovery 430 may involve a negotiation based on possible configurations allowed by the application, the user, or the service provider. In such a case, discover can involve exchanges between the party of possible and desired configurations until a selected one is accepted by all parties. Additionally, discovery 430 may involve, for example, load balancing of the different components. That is, the discovered resource or service can be based on load balanced, availability, etc.

Upon discovering 430 a candidate multimodal manager 225, the user agent 240 initiates 435 a multimodal session with the assigned multimodal manager 225. After the multimodal session is initiated 435, the user agent 240 initiates the multimodal service by providing 440 the application data and its current state to the multimodal manager 225. The multimodal manager 225 uses this data to initiate and synchronize 445 other components of the system such as user agent(s) 235 and processing engine(s) 230 used to support the other modes and/or devices. Additionally or alternatively, the multimodal manager can determine from the application data that more capabilities are supported by the application. In such a case, the multimodal manager can discover components to support these capabilities, setup a session with these components, and then pass data to these components, i.e., repeating the steps above to link the other user agents to the multimodal manager.

At this point, the user agent 240 is part of a multimodal or multi-device infrastructure configuration, provisioned with the multimodal or multi-device application. It is ready for presentation and interaction with the user. During the multimodal session, according to one embodiment, the different modalities may be activated or de-activated by the multimodal manager. This may be based on preferences of the user made available to the multimodal manager, the multimodal or multi-device application data and state, requests to activate or deactivate sent from a user agent about itself or about another user agent or modality.

Preferences of the users, in terms of what modality to use etc, can be server-side preferences that determine, for the page served to the user, what modalities/user agents should be used and for what purposes. The preferences can also be user agent preferences that may result in the user agent of the user device requesting particular modalities or user agents to be activated by the multimodal manager at some moment or for some purpose. This is can be done by a special user interface that lets the user select settings that are then passed to the multimodal manager and applied as needed. Furthermore, the preferences can be multimodal manager preferences that allow the multimodal manager to activate or deactivate user agents or modalities as needed based on the moment or application/interaction state.

Figure 5:
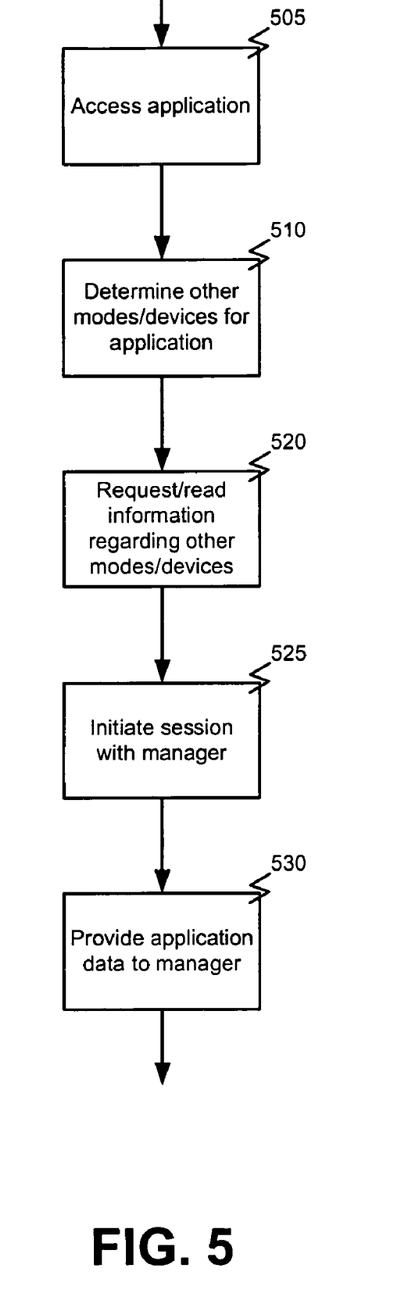
FIG. 5 is a flowchart illustrating a process for a user agent to obtain multimodal and/or multi-device configuration and support according to one embodiment of the present invention.

FIG. 5 is a flowchart illustrating a process for a user agent to obtain multimodal and/or multi-device configuration and support according to one embodiment of the present invention. In this example, the process begins with accessing 505 a multimodal application. As noted above, a user can accesses a multimodal and/or multi-device application by entering or clicking/selecting a URI on one of its user agents. In turn, the server provides the application or access to the application to the user agent of the user's device.

A plurality of modes or devices supported by the application can be determined 510. Determining 510 the plurality of modes or devices supported by the application can be based on information explicitly provided by the application, information obtained by parsing application data and inferring the plurality of modes or devices, or information obtained from a separate repository of information related to a multimodal and/or multi-device service. For example, the application data could contain information explicitly provided by the application developer including, possibly, details on the capabilities and/or configurations of the other components. Alternatively or additionally, the user agent may be able to extract details on what other modalities, components and their capabilities to involve by parsing the received application data. Alternatively or additionally, the user agent may be able to extract that information from another source such as, for example, a UDDI repository associated to the service.

Information identifying one or more multimodal services related to the modes or devices used by the application can be read 520 from a central repository. This can be accomplished by querying or otherwise accessing the information in the registrar. Alternatively, it may involve requesting the multimodal/multi-device infrastructure to look up or otherwise access the information in the registrar 220.

Once the multimodal services related to the modes or devices supported by the application are found, a session can be initiated 525 with a multimodal manager of the multimodal infrastructure and application data from the multimodal application can be provided 530 to the multimodal manager.

Figure 6:
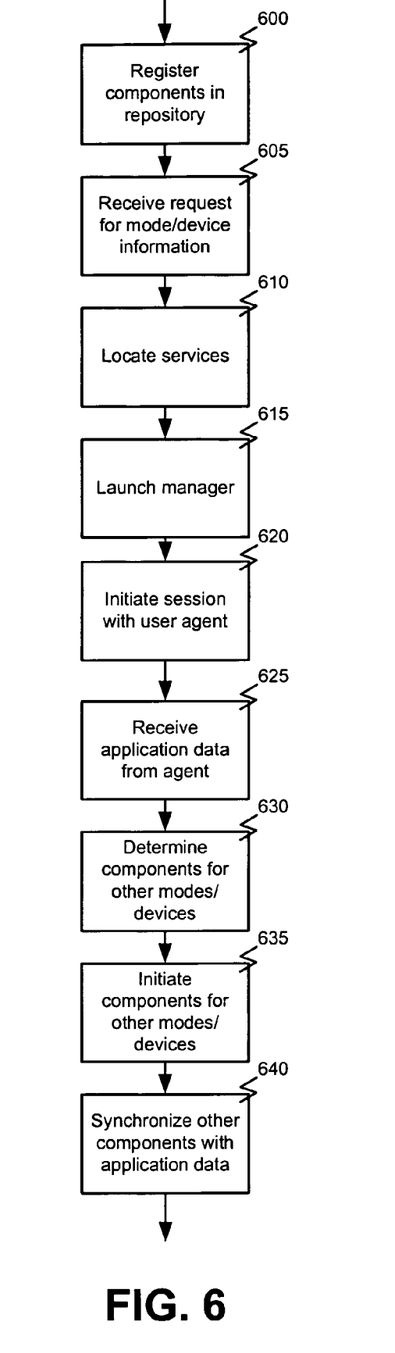
FIG. 6 is a flowchart illustrating a process for a multimodal and/or multi-device infrastructure to provide multimodal and/or multi-device configuration and support according to one embodiment of the present invention.

FIG. 6 is a flowchart illustrating a process for a set of multimodal and/or multi-device infrastructure components to provide multimodal and/or multi-device configuration and support according to one embodiment of the present invention. In this example, the process begins with registering 600 components of a multimodal service in a central repository. That is, the addresses and capabilities of the different components that the service provider make available to support its multimodal and multi-device services can be registered 600 such as in a registrar or a central repository.

A request for multimodal services can be received 605 from a user agent indicating one of more modes or devices supported by a multimodal application. In response to a request for multimodal services from a user agent of a user device, components supporting the one or more modes or devices can be located 610 based on the registered components of the multimodal service in the central repository. Locating these components can be based on the registered components of the multimodal service in the registrar 220. Alternatively, the registrar 220 may be made available to or accessible by the user agent 240 which can look-up or otherwise discover the registered components that are already configured. In such a case, the user agent only establishes a session with a block of components already correctly configured.

A multimodal manager can be launched 615 in response to the request for multimodal services from the user agent of the user device and a session can be initiated 620 between the multimodal manager and the user agent of the user device. In response to receiving 625 application data related to a multimodal application from the user agent, one or more components for supporting execution of the application can be determined 630 by the multimodal manager. The one or more components can be initiated 635 and synchronized 640 with the application data from the user agent of the user device by the multimodal manager. That is, once the multimodal manager determines 630 which components are to be used to support execution of the application, the multimodal manager can initiate the components and synchronize them with the application data from the user agent. The multimodal manager then coordinates data and synchronizes execution flow to and from the user agent and other components during execution of the application.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing multimodal configuration and support, the system comprising:
a first computing device executing a multimodal application;
a second computing device executing a user agent adapted to discover and dynamically configure one or more modes of the multimodal application from the user agent by accessing the multimodal application, determining a plurality of modes or devices supported by the multimodal application, and requesting multimodal services based on the plurality of modes or devices supported by the multimodal application; and
at least a third computing device executing a set of multimodal infrastructure components communicatively coupled with the user agent and registered in a central repository wherein the registered components are adapted to, in response to the request for multimodal services from the user agent, launch a multimodal manager, initiate a session between the multimodal manager and the user agent, and determine one or more components supporting the plurality of modes or devices based on the registered components of the multimodal service in the central repository;
wherein after initiating the session between the multimodal manager and the user agent, the user agent provides application data to the multimodal manager; and
in response to receiving the application data from the user agent, the multimodal manager is adapted to determine the one or more components for supporting execution of the multimodal application, initiate the one or more components, and synchronize the one or more components with the application data from the user agent.

2. The system of claim 1, wherein determining one the or more components supporting the plurality of modes or devices comprises locating components that are configured for operation with the multimodal application.

3. The system of claim 1, wherein the application data includes information related to a current state of the multimodal application.

4. The system of claim 3, wherein the multimodal manager determines from the application data additional capabilities supported by the multimodal application, discovers multimodal components to support the additional capabilities, establishes a session with the multimodal components to support the additional capabilities, and synchronizes the multimodal components to support the additional capabilities with the application data.

5. The system of claim 1, wherein the user agent determines the plurality of modes or devices supported by the multimodal application based on information explicitly provided by the multimodal application.

6. The system of claim 1, wherein the user agent determines the plurality of modes or devices supported by the multimodal application based on parsing application data and inferring the plurality of modes or devices.

7. The system of claim 1, wherein the user agent determines the plurality of modes or devices supported by the multimodal application based on information obtained from a source separate from the user agent and the multimodal infrastructure components.

8. The system of claim 7, wherein the source separate from the user agent and the multimodal infrastructure components comprises a catalog of modes or devices.

9. The system of claim 7, wherein the source separate from the user agent and the multimodal infrastructure components is a Universal Description, Discovery, and Integration (UDDI) repository associated with a multimodal service.

10. The system of claim 1, wherein the user agent determines the plurality of modes or devices supported by the multimodal application based on information obtained from a Uniform Resource Locator (URL) for the multimodal application.

11. The system of claim 1, wherein the user agent determines the plurality of modes or devices supported by the multimodal application based on information obtained from an extension of a file returned by the multimodal application.

12. The system of claim 1, wherein the user agent determines the plurality of modes or devices supported by the multimodal application based on information obtained from a content of a file.

13. The system of claim 1, wherein the multimodal infrastructure components locate services supporting the plurality of modes or devices supported by the multimodal application based on the registered components of the multimodal service in the central repository and load balancing between the multimodal services.

14. The system of claim 13, wherein the multimodal infrastructure components are further adapted to dynamically balance a load between the multimodal services.

15. The system of claim 1, wherein the multimodal infrastructure components locate components supporting the plurality of modes or devices supported by the multimodal application based on the registered components of the multimodal service in the central repository and availability of the registered components.

16. The system of claim 1, wherein the multimodal infrastructure components are further adapted to activate or deactivate the multimodal manager based on preferences of a user.

17. The system of claim 16, wherein the preferences of the user comprise server-side preferences.

18. The system of claim 16, wherein the preferences of the user comprise user-agent preferences.

19. The system of claim 16, wherein the preferences of the user comprise multimodal manager preferences.

20. The system of claim 1, wherein the multimodal infrastructure components are further adapted to activate or deactivate the multimodal manager based on application data from the user agent.

21. The system of claim 1, wherein the multimodal infrastructure components are further adapted to activate or deactivate the multimodal manager based on a request from the user agent.

22. The system of claim 1, wherein the multimodal infrastructure components are further adapted to end the session between the multimodal manager and the user agent based on the user agent deactivating itself.

23. The system of claim 1, wherein the multimodal infrastructure components are further adapted to end the session between the multimodal manager and the user agent based on the user agent deactivating another user agent.

24. A method of providing multimodal configuration and support, the method comprising:
   accessing a multimodal application, executing on a first computing device, via a user agent, executing on a second computing device;
   determining with the user agent a plurality of modes or devices supported by the multimodal application; and
   requesting multimodal services via the user agent based on the plurality of modes or devices supported by the multimodal application; the request indicating one or more of the plurality of modes or devices discovered by the user agent as being supported by the multimodal application;
   initiating a session with a multimodal manager of a multimodal infrastructure and providing application data from the multimodal application to the multimodal manager; and
   in response to receiving application data related to the multimodal application from the user agent, determining one or more components for supporting execution of the multimodal application, initiating the one or more components, and synchronizing the one or more components with the application data from the user agent.

25. The method of claim 24, wherein determining the plurality of modes or devices supported by the multimodal application is based on information explicitly provided by the multimodal application.

26. The method of claim 24, wherein determining the plurality of modes or devices supported by the multimodal application is based on parsing application data and inferring the plurality of modes or devices.

27. A method of providing dynamic multimodal configuration and support, the method comprising:
   registering components of a multimodal service, executing on a first computing device, in a central repository;
   receiving a request for multimodal services from a user agent executing on a user device, the request indicating one or more modes or devices discovered by the user agent executing on the user device as being supported by a multimodal application, executing on a second computing device, the multimodal application accessed by the user agent executing on the user device to discover the one or more modes or devices; and in response to the request for multimodal services from the user agent, launching a multimodal manager on the first computing device, initiating a session between the multimodal manager and the user agent executing on the user device, and locating multimodal services supporting the one or more modes or devices discovered by the user agent based on the registered components of the multimodal service in the central repository;

in response to the multimodal manager receiving application data related to the multimodal application from the user agent executing on the user device, the multimodal manager determining one or more components for supporting execution of the multimodal application, initiating the one or more components, and synchronizing the one or more components with the application data from the user agent.

28. The method of claim 27, wherein locating multimodal services supporting the one or more modes or devices discovered by the user agent executing on the user device based on the registered components of the multimodal service in the central repository is based on load balancing between the services.

29. The method of claim 28, further comprising dynamically balancing a load between services.

30. The method of claim 27, wherein locating multimodal services supporting the one or more modes or devices discovered by the user agent executing on the user device based on the registered components of the multimodal service in the central repository is based on availability of the multimodal services.

31. The method of claim 27, further comprising activating or deactivating the multimodal manager based on preferences of a user of the user device.

32. The method of claim 31, wherein the preferences of the user of the user device comprise server-side preferences.

33. The method of claim 31, wherein the preferences of the user of the user devices comprise user-agent preferences.

34. The method of claim 31, wherein the preferences of the user of the user device comprise multimodal manager preferences.

35. The method of claim 27, further comprising activating or deactivating the multimodal manager based on application data from the user agent of the user device.

36. The method of claim 27, further comprising activating or deactivating the multimodal manager based on a request from the user agent of the user device.

37. The method of claim 27 further comprising ending the session between the multimodal manager and the user agent of the user device based on the user agent of the user device deactivating itself.

38. The method of claim 27 further comprising ending the session between the multimodal manager and the user agent of the user device based on the user agent of the user device deactivating another user agent.

* * * * *

UNITED STATES PATENT AND TRADEMARK OFFICE
CERTIFICATE OF CORRECTION

| | | |
|---|---|---|
| PATENT NO. | : 7,716,682 B2 | Page 1 of 1 |
| APPLICATION NO. | : 11/326209 | |
| DATED | : May 11, 2010 | |
| INVENTOR(S) | : Stephane H. Maes | |

It is certified that error appears in the above-identified patent and that said Letters Patent is hereby corrected as shown below:

In column 13, line 3-4, in claim 2, delete "one the or more" and insert -- the one or more --, therefor.

In column 16, line 20, in claim 37, delete "claim 27" and insert -- claim 27, --, therefor.

In column 16, line 24, in claim 38, delete "claim 27" and insert -- claim 27, --, therefor.

Signed and Sealed this
Fourteenth Day of June, 2011

David J. Kappos
*Director of the United States Patent and Trademark Office*